US011782755B2

(12) United States Patent
Thomas et al.

(10) Patent No.: US 11,782,755 B2
(45) Date of Patent: Oct. 10, 2023

(54) METHODS, SYSTEMS, ARTICLES OF MANUFACTURE, AND APPARATUS TO OPTIMIZE THREAD SCHEDULING

(71) Applicant: Intel Corporation, Santa Clara, CA (US)

(72) Inventors: Renji Thomas, Hillsboro, OR (US); Chris Binns, Hillsboro, OR (US); Pietro Mercati, Santa Clara, CA (US); Jianfang Zhu, Hillsboro, OR (US); Ashraf H. Wadaa, Beaverton, OR (US); Michael Kishinevsky, Hillsboro, OR (US); Ahmed Shams, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 16/729,026

(22) Filed: Dec. 27, 2019

(65) Prior Publication Data

US 2020/0133725 A1 Apr. 30, 2020

Related U.S. Application Data

(60) Provisional application No. 62/942,619, filed on Dec. 2, 2019.

(51) Int. Cl.
| | |
|---|---|
| *G06F 9/46* | (2006.01) |
| *G06F 9/48* | (2006.01) |
| *G06F 11/34* | (2006.01) |
| *G06F 30/20* | (2020.01) |
| *G06F 9/38* | (2018.01) |

(52) U.S. Cl.
CPC .......... *G06F 9/4881* (2013.01); *G06F 9/3836* (2013.01); *G06F 11/3433* (2013.01); *G06F 30/20* (2020.01)

(58) Field of Classification Search
CPC ..................................................... G06F 9/4881
USPC ........................................................ 718/102
See application file for complete search history.

(56) References Cited

U.S. PATENT DOCUMENTS

| | | | | |
|---|---|---|---|---|
| 10,120,727 | B2* | 11/2018 | Bartfai-Walcott | .... G06F 9/5094 |
| 2009/0089782 | A1* | 4/2009 | Johnson | ................ G06F 1/3203 |
| | | | | 718/100 |

(Continued)

OTHER PUBLICATIONS

European Patent Office, "European Search Report," issued in connection with European Patent Application No. 20197340.1, dated Mar. 2, 2021, 13 pages.

(Continued)

*Primary Examiner* — Mehran Kamran
(74) *Attorney, Agent, or Firm* — Hanley, Flight & Zimmerman, LLC

(57) ABSTRACT

An apparatus comprising: a model to generate adjusted tuning parameters of a thread scheduling policy based on a tradeoff indication value of a target system; and a workload monitor to: execute a workload based on the thread scheduling policy; obtain a performance score and a power score from the target system based on execution of the workload, the performance score and the power score corresponding to a tradeoff indication value; compare the tradeoff indication value to a criterion; and based on the comparison, initiate the model to re-adjust the adjusted tuning parameters.

25 Claims, 7 Drawing Sheets

(56) References Cited

U.S. PATENT DOCUMENTS

| | | | | |
|---|---|---|---|---|
| 2009/0249094 A1* | 10/2009 | Marshall | G06F 1/3203 | 713/320 |
| 2009/0254660 A1* | 10/2009 | Hanson | H04L 12/10 | 709/226 |
| 2009/0254909 A1* | 10/2009 | Hanson | G06F 1/329 | 718/102 |
| 2011/0213508 A1* | 9/2011 | Mandagere | G06F 9/5088 | 700/291 |
| 2011/0283286 A1* | 11/2011 | Wu | G06F 1/329 | 718/103 |
| 2012/0079357 A1* | 3/2012 | Salsbery | H04W 24/08 | 714/E11.029 |
| 2015/0192980 A1* | 7/2015 | Sen | G06F 9/5094 | 713/320 |
| 2015/0241942 A1* | 8/2015 | Venumuddala | G06F 1/3206 | 713/320 |
| 2017/0185132 A1* | 6/2017 | Bodas | G06F 11/3062 | |
| 2017/0205863 A1* | 7/2017 | Lee | G06F 1/3206 | |
| 2018/0027055 A1* | 1/2018 | Balle | G06F 3/0655 | 709/226 |
| 2019/0196912 A1* | 6/2019 | Didehban | G06F 11/1407 | |
| 2019/0258528 A1* | 8/2019 | Yeung | G06F 9/4887 | |
| 2020/0167196 A1* | 5/2020 | Smith | G06F 9/4881 | |
| 2020/0310510 A1* | 10/2020 | Belagal Math | G06N 20/00 | |

OTHER PUBLICATIONS

European Patent Office, "Extended European Search Report," issued in connection with European Patent Application No. 20197340.1, dated Jun. 2, 2021, 12 pages.

European Patent Office, "Communication pursuant to Article 94(3) EPC," issued in connection with European Application No. 20197340, dated Jan. 24, 2023, 8 pages.

* cited by examiner

METHODS, SYSTEMS, ARTICLES OF MANUFACTURE, AND APPARATUS TO OPTIMIZE THREAD SCHEDULING

RELATED APPLICATION

This patent arises from a U.S. non-provisional patent application of U.S. Provisional Patent Application No. 62/942,619, which was filed on Dec. 2, 2019. U.S. Provisional Patent Application No. 62/942,619 is hereby incorporated herein by reference in its entirety. Priority to U.S. Provisional Patent Application No. 62/942,619 is hereby claimed.

FIELD OF THE DISCLOSURE

This disclosure relates generally to computing devices, and, more particularly, to methods, systems, articles of manufacture, and apparatus to optimize thread scheduling.

BACKGROUND

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) results in output(s) consistent with the recognized patterns and/or associations.

BRIEF DESCRIPTION OF THE DRAWINGS

The figures are not to scale. In general, the same reference numbers will be used throughout the drawing(s) and accompanying written description to refer to the same or like parts.

Figure 1:
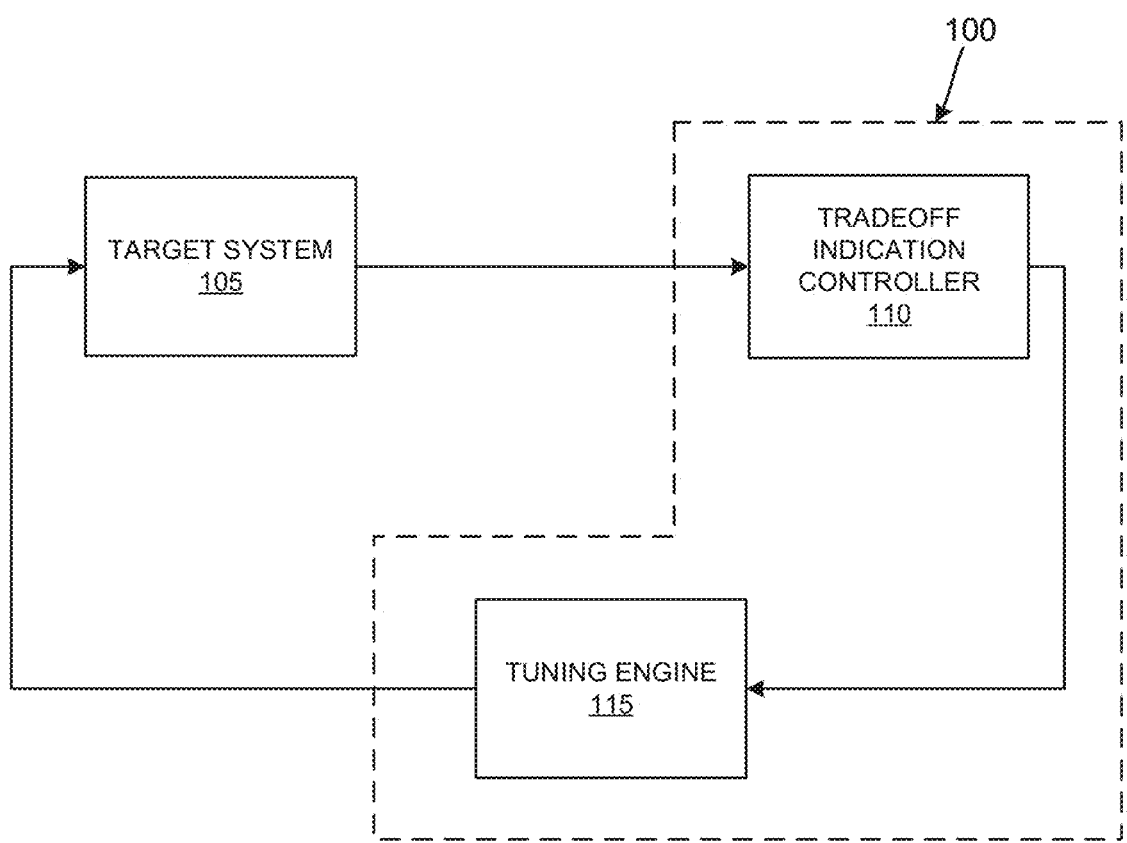
FIG. 1 is a block diagram of an example tuning system constructed in accordance with teachings of this disclosure to optimize the thread scheduling of an example target system.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Today's personal computing devices are expected to deliver real-world user experience of all day battery life, near zero-wait responsiveness, and superb performance. Systems (e.g., systems of personal computing devices) have been designed based on satisfying the needs of users of different classes (e.g., gamers, home users, students, etc.). Such systems deliver hardware (HW) and/or software (SW) tradeoffs to achieve different performance goals. For example, systems may include an operating system (OS) to achieve different performance goals during workload execution. In some examples, the OS does not optimize thread scheduling policies on a central processing unit (CPU), which may result in poor user experience in terms of power, performance, and/or responsiveness. Thread scheduling policies are policies that assign workloads (e.g., sets of executable instructions referred to herein as threads) to resources (e.g., CPU cores, memory, accelerators, etc.). Conventional thread scheduling configuration methodologies are labor-intensive, non-systematic, and lack generalization and customization capabilities. Therefore, conventional thread scheduling configurations do not achieve sufficient levels of optimization of target systems during workload execution. To address these and/or other limitations, examples disclosed herein evaluate the quality of OS thread scheduling policies by automatically switching relevant OS parameters to enable fully automated and customizable tradeoff-guided tuning of parameters.

Examples disclosed herein include circuitry and/or executable instructions such as software to enable customization of the tuning parameters for OS thread scheduling policies. Such customization of tuning parameters enable the CPU and/or other system resources to achieve power objectives and/or performance objectives. Examples disclosed herein combine performance and power scores of a target system (e.g., a system in which the OS is running) into a single metric that can be used as an indicator of the target system's OS thread scheduling policy quality. For example, a tuning engine is utilized to obtain (e.g., read) performance and power scores from hardware registers of resources (e.g., CPU cores, memory, accelerators, etc.) before, during, and/or after a thread is executed at such resources. Examples disclosed herein accept a set of user-configurable parameters (e.g., policies) to customize for (i) specific classes (e.g., critical, optional, etc.) of workload performances, (ii) subsets of components (e.g., power-hungry components), and (iii) power/performance tradeoff.

In examples disclosed herein, the target system (e.g., a computing device) is automatically evaluated by a machine learning model(s). A workload automation setup (e.g., a workload monitor) is employed to measure power consumed by the target system and to evaluate performance of OS thread scheduling policies on a processor (e.g., a CPU) of the target system when adjusting relevant OS parameters. For example, the workload automation setup obtains parameters (e.g., parameters selected by one or more machine learning models), and executes one or more workloads with the parameters to evaluate the performance achieved when using the parameters for OS thread scheduling.

Many different types of machine learning models and/or machine learning architectures exist. In examples disclosed herein, a Bayesian model is used. Using a Bayesian model enables representing conditional dependence as edges in a directed graph. In some examples, the machine learning model(s)/architecture(s) are graphical neural network(s) (GNN). However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are training parameters that are determined prior to initiating the training process.

Different types of training may be performed based on the type of ML/AI model and/or the expected output. For example, supervised training uses inputs and corresponding expected (e.g., labeled) outputs to select parameters for the ML/AI model that reduce model error (e.g., by iterating over combinations of select parameters). As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training approach may additionally or alternatively be used. In examples disclosed herein, training is performed until an acceptable amount of error is achieved (e.g., less than a target performance). In examples disclosed herein, training is performed at the target system, at a host machine providing a service to the target system (e.g., a virtual machine), etc. Training is performed using hyperparameters that control how the learning is performed (e.g., a learning rate, a number of layers to be used in the machine learning model, etc.).

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Examples disclosed herein influence the way a processor behaves. For instance, examples disclosed herein affect the amount of energy consumed during the executing of one or more workloads and/or how fast the processor can execute a single workload or multiple workloads. Examples disclosed herein can control the behavior of the processor architecture by adjusting OS thread tuning parameters.

In a computer (e.g., a target system), it is desirable to balance power usage and performance. Between two customers, one may care more about power and the other about performance. Power usage and/or performance may be affected by either or both of hardware (e.g., a processor, a system, a chip (SOC), etc.) and/or an operating system (OS) which may execute on the hardware. In this manner, it may be desirable to configure both the hardware and the OS to achieve a desired tradeoff of power consumption and performance.

FIG. 1 is a block diagram of an example tuning system 100 to improve (e.g., optimize) thread scheduling in an example target system 105. The example tuning system 100 includes an example tradeoff indication controller 110 and an example tuning engine 115.

In FIG. 1, the example target system 105 is to be configured (e.g., optimized for power consumption and/or performance) based on user configuration data. As used herein, user configuration data may be pre-determined policies, instructions, user-configurable parameters, etc., which describe preferences for configuration of target system 105. For example, the target system 105 may be a computer, a computing device, a mobile phone, a tablet, a laptop, etc., which includes a hardware processor that executes an OS to schedule threads for execution by one or more components of the processor (e.g., one or more cores, accelerators, etc.) or offloading circuitry (e.g., a graphical processor unit (GPU)). As used herein, a thread is a set of machine executable instructions that can be assigned independently (e.g., by a scheduler) to hardware circuitry for execution. A scheduler is typically a part of the OS. A thread scheduling policy is a set of policies (e.g., executable instructions) that define how work (e.g., a set of threads) is assigned by the scheduler to resources (e.g., CPU cores, memory, accelerators, etc.) to complete the work. In some examples, the target system 105 may operate at an endpoint environment, an edge environment, and/or a cloud environment. For example, the target system 105 may be any endpoint device (e.g., an Internet-enabled tablet, a mobile handset (e.g., a smartphone), a watch (e.g., a smartwatch), a fitness tracker, a headset, a vehicle control unit (e.g., an engine control unit, an electronic control unit, etc.), and IoT device, etc.), an edge platform (e.g., an IoT device, an edge-computing platform, etc.), a server, etc. An example implementation of the target system 105 is described in further detail below in connection with FIG. 2.

In FIG. 1, the example tuning system 100 includes the example tradeoff indication controller 110 to process performance scores and power scores of the target system 105. The tradeoff indication controller 110 of the illustrated example determines a target indication value (TIV) based on one or more performance scores and/or one or more power scores. For example, the performance and power scores (e.g., performance score is denoted as $p\_i$ and power score is denoted as $w\_{(i,j)}$) are functions of specific operations (e.g., OS operation, hardware operation, etc.). Such performance and power scores can be obtained from the target system 105. For example, the tradeoff indication controller 110 can obtain, read, write, extract, and/or profile performance and power scores from hardware registers, hardware performance counters, etc. In some examples, the performance and power scores are represented as integer values (e.g., −10, 0, 3, 7, etc.). In other examples, the performance and power scores are represented as bit values, Boolean values, character values, and/or any other computer readable value.

In FIG. 1, the example tradeoff indication controller 110 determines the TIV to control the thread scheduling policy. The thread scheduling policy manages the dynamic core count C, the idle states I and the operating frequency F of the example target system 105. For example, the thread scheduling policy manages C, I, and F of the target system 105 during workload execution. In the above example, C is indicative of the number of cores switched on (e.g., the cores are switched on/off during normal operation). I is indicative of the idle state residency (e.g., a percentage of time spent in idle state). F is indicative of the operating frequency of the processing cores. For example, different computing elements and/or components (e.g., GPU, CPU, etc.) may exhibit different frequency levels. In general, the higher the frequency of the components, the faster the thread scheduling policy executes the machine readable instructions (e.g., threads).

The dynamic core count C, the idle states I and the operating frequency F of the example target system 105 are respectively controlled by parameters, (referred to respectively herein as θ_C, θ_I, and θ_F). These parameters modify the overall behavior of the OS thread scheduling policy, thereby affecting performance and power of the target system 105. Each of these parameters may be assigned to a corresponding control knob (e.g., a variable that may be adjusted to set the corresponding parameters to thereby modify the scheduling policy). For example, a configuration knob for one of the parameters (θ_C, θ_I, or θ_F) can be assigned a value to control the OS of the processor under a specific workload. The net result of that control is a particular amount of energy consumption when that workload is executed. For example, when the workload of the target system 105 is a video running in full screen, that activity can be handled/processed by a number of different components. The control knobs influence the thread scheduling which control the components. For example, the thread scheduling policy schedules two or more threads on the same core (C) of the processor or on two or more different cores.

In some examples, the tradeoff indication controller 110 provides an input to the example tuning engine 115. For example, the tradeoff indication controller 110 provides the TIV to the tuning engine 115 to adjust one or more tuning parameters. The tradeoff indication controller 110 may include an interface (e.g., a user interface (UI)) to obtain user configuration data. For example, the user may determine the degree to which they desire the target system 105 to optimize for workload performance and/or for power performance. In this manner, the example tradeoff indication controller 110 informs the example tuning engine 115 of the tradeoff (e.g., power consumption use or performance, such as optimize for performance, monitor battery life of at least x number of components, etc.) the tuning engine 115 is to achieve.

In FIG. 1, the example tuning system 100 includes the tuning engine 115 to adjust one or more of the tuning parameters (θ_C, θ_I, or θ_F) based on the TIV. An example implementation of the tuning engine 115 is illustrated in further detail in FIG. 3, in which the tuning engine 115 includes a machine learning model to adjust initial tuning parameters to meet a target optimization of the target system 105. The target optimization of the target system 105 is indicative of a maximum improvement of the TIV value. For example, when the TIV value can no longer increase based on the adjusted tuning parameters, the target optimization is met. The example tuning engine 115 initiates a workload monitor which enables automatic application of the selected tuning values to re-configure the target system 105 at each iteration. Also the example workload monitor of FIG. 3 may automatically retrieve evaluation scores (e.g., performance scores generated by the hardware of the target system 105) and notify the machine learning model of the evaluation scores. The machine learning model may then select the next configuration of parameters to apply. For example, the tuning engine 115 iterates through different configuration sets of the tuning parameters based on the evaluation scores until a desired tradeoff set of performance and power usage of the target system 105 is achieved. In some examples, the tuning engine 115 includes an error-checking and recovery controller to allow for requested customization without fear of reaching an inoperative or other undesirable state. For example, the error-checking and recovery controller monitors the operating state of the target system 105. If an unexpected (e.g., undesirable) state is detected, the target system 105 under evaluation is reverted to a last known good state and different parameters may then be applied.

Figure 2:
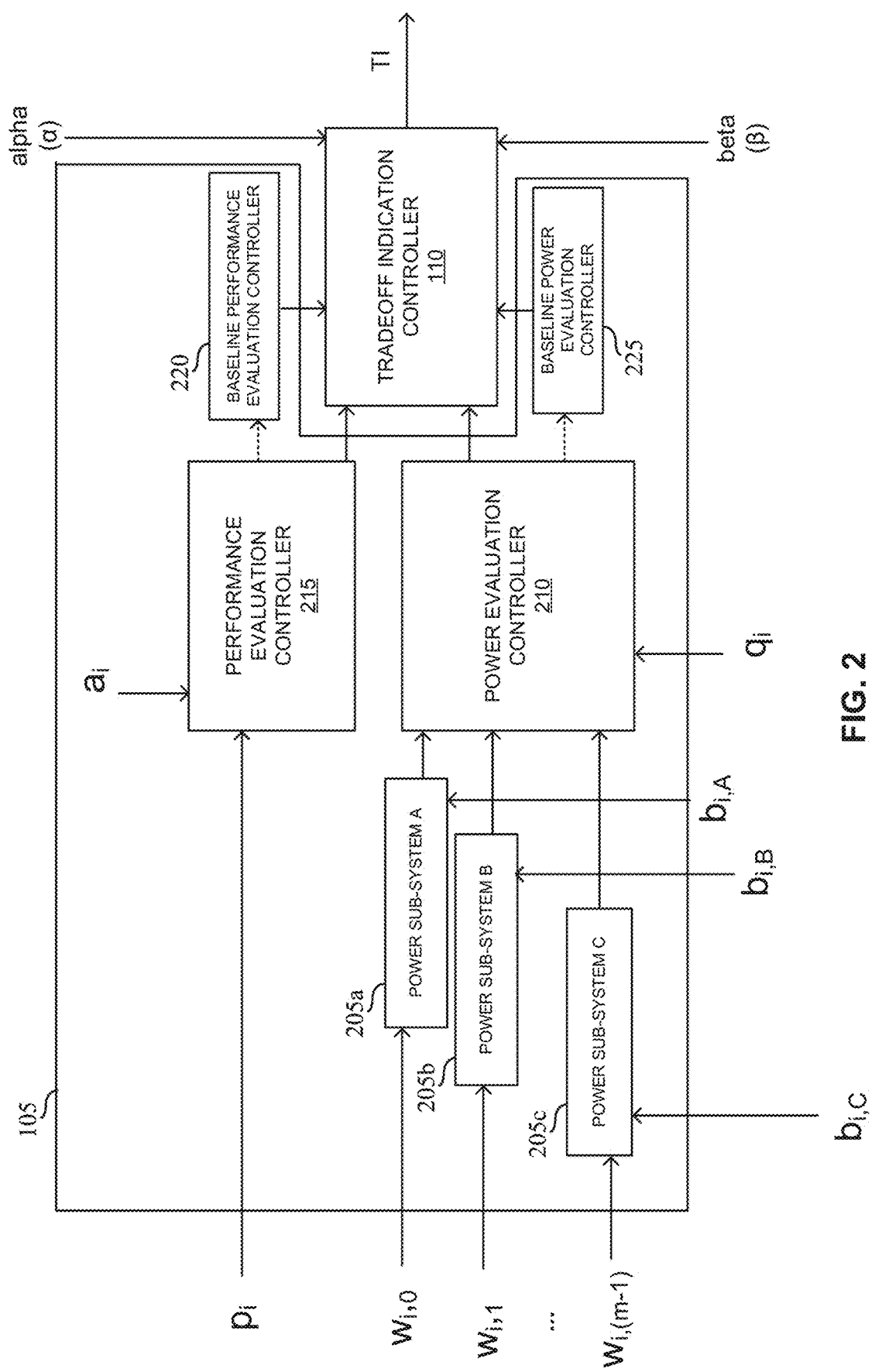
FIG. 2 is a block diagram of an example implementation of the target system of FIG. 1.

FIG. 2 is a block diagram of an example implementation of the target system 105 of FIG. 1. The example target system 105 of FIG. 2 includes example power sub-systems 205a-c, an example power evaluation controller 210, an example performance evaluation controller 215, an example baseline performance evaluation controller 220, and an example baseline power evaluation controller 225.

In FIG. 2, the example target system 105 includes example power sub-systems 205a-c that may consume variable degrees of power. For example, the power sub-systems 205a-c may be a CPU, a GPU, an FPGA, a core, an accelerator, or any other type of hardware that can execute one or more workloads i. In some examples, the power sub-systems 205a-c may be selected by a user. For example, the target system 105 illustrated in FIG. 2 includes a power evaluation controller 210 to determine the power sub-systems 205a-c that are to be considered by the tuning engine 115. A user may select the power sub-systems 205a-c that they desire to optimize. In such an example, a user may configure power sub-system selectors $q_i$ where i is the power sub-system (e.g., power sub-system A 205a, power sub-system B 205b, or power sub-system C 205c).

Additionally, a user can configure workload selectors for the power sub-systems (e.g., selected by the power sub-system selectors $q_i$.). For example, the user may configure power workload selectors $b_{i,j}$ where i is the workload and j is the power sub-system type. In such an example, if workload selector $b_{2,3}=0$ (e.g., the workload selector indicative of workload 2 is to be assigned to sub-system 3), then the power score $w_{2,3}$ of workload #2 for the $3^{rd}$ subsystem (e.g., the graphics processor (GPU) or the memory subsystem) will not be included in the overall power objective. For example, the power objective corresponds to the desired power consumption of the target system 105 during workload execution. Each of the power sub-systems 205a-c is assigned a respective power score $w_{i,j}$ that is determined during execution of the workload (e.g., when the workload is processed per the tuning parameters). In this manner, the power workload selectors $b_{i,j}$ may affect the power scores $w_{i,j}$ for the current operation and/or the power scores $w_{i,j}$ may be used to choose different power workload selectors $b_{i,j}$ for a future operation.

In the example of FIG. 2, the power evaluation controller 210 may obtain the power sub-system selectors $q_i$ and provide them to the tradeoff indication controller 110 to be analyzed. In some examples, the power evaluation controller 210 determines a weighted power score $f_{power,j}$ and a weighted power system score $f_{power}$ by utilizing Equations 1 and 2 below. In Equation 1, m is the total number of available workloads, 0<j<l–1 in which l is the total number of power sub-systems 205a-c.

$$f_{power,j} = b_{0,j}*w_{0,j} + b_{1,j}*w_{1,j} + b_{2,j}*w_{2,j} + \ldots + b_{m-1,j}*w_{m-1,j} \quad \text{Equation 1}$$

$$f_{power} = q_0*f_{power0} + q_1*f_{power1} + \ldots + q_{(l-1)}*f_{power(l-1)}$$

In the example of FIG. 2, example performance evaluation controller 215 evaluates the performance of a workload. In some examples, a user can configure performance workload selectors $a_i$ to identify workloads that will be considered by the example tuning engine 115, where i is the workload and a is the workload performance weight. For example, if a user configures $a_1=0$, the performance score $p_1$ of workload #1 will not be considered during parameter tuning. In this example, the performance evaluation controller 215 obtains performance scores p from hardware (e.g., hardware registers, hardware performance counters, etc.). For example, the performance evaluation controller 215 extracts, reads, and/or obtains performance scores from hardware that are generated during workload execution (e.g., when the tuning parameters are applied).

In some examples, the performance evaluation controller 215 determines the weighted performance score $f_{perf}$ for the workloads. For example, the performance evaluation controller 215 may utilize Equation 3 below to determine the weighted performance score.

$$f_{perf} = a_0*p_0 + a_1*p_1 + a_2*p_2 + \ldots + a_{(m-1)}*p_{(m-1)} \quad \text{Equation 3}$$

In the example of FIG. 2, the example baseline performance evaluation controller 220 and the example baseline power evaluation controller 225 respectively determine the initial performance score $p_i$ and power score $w_{i,j}$ of the target system 105. For example, the baseline performance score $f_{perf\_baseline}$ is the initial performance score of the target system 105 before the example tuning engine 115 adjusts the tuning parameters. The baseline performance score corresponds to a minimum performance of the target system 105. Additionally, the example baseline power score $f_{perfbaseline}$ is the initial power score of the target system 105 before the example tuning engine 115 adjusts the tuning parameters. The baseline power score corresponds to a minimum power score of the target system 105. In some examples, the example baseline performance evaluation controller 220 and the example baseline power evaluation controller 225 are initiated one time (e.g., at the onset of workload execution).

In the example of FIG. 2, the example tradeoff indication controller 110 obtains the weighted performance score $f_{perf}$, the weighted system power score $f_{power}$, the baseline performance score $f_{perfbaseline}$, and the baseline power score $f_{power\_baseline}$. For example, power evaluation controller 210 provides the weighted system power score $f_{power}$ to the tradeoff indication controller 110, the example performance evaluation controller 215 provides the weighted performance score $f_{perf}$ to the tradeoff indication controller 110, the example baseline performance evaluation controller 220 provides the baseline performance score $f_{perfbaseline}$ to the tradeoff indication controller 110, and the example baseline power evaluation controller 225 provides the baseline power score $f_{power\_baseline}$ to the tradeoff indication controller 110. The example tradeoff indication controller 110 determines the tradeoff indication value (TIV) based on the scores (e.g., $f_{perf}$, $f_{power}$, $f_{perfbaseline}$, and/or $f_{power\_baseline}$). In some examples, a user can configure a performance weight $\alpha$ and a power weight $\beta$. The performance weight $\alpha$ and power weight $\beta$ reflect the degree to which a user wishes to enhance the performance of the target system 105 when processing workloads and/or the degree to which to enhance the power of the target system 105 when processing workloads. For example, when performance weight $\alpha$ is a greater value than power weight $\beta$, the tuning engine 115 adjusts tuning parameters to prioritize the performance improvement of the workload (e.g., quality of video streaming) over the power consumption during workload execution (e.g., the saving of battery life while video streaming). In other examples, when the power weight $\beta$ is greater than performance weight $\alpha$, the tuning engine 115 adjusts tuning parameters to privilege power consumption improvement during workload execution (e.g., save battery life while video streaming) over performance improvement of the workload (e.g., quality of video streaming). In some examples, the performance weight $\alpha$ and the power weight $\beta$ are of equal values, and the tuning engine 115 adjusts the tuning parameters to a degree that satisfies a ratio of one in which workload performance is equal to power consumption during workload execution. In some examples, the performance weight $\alpha$ and the power weight $\beta$ can be ratios and/or percentages.

In some examples, the tradeoff indication controller 110 utilizes Equation 4 below to determine the tradeoff indication value. In Equation 4, $\Delta f_{perf}$ is the difference between the actual performance score and the baseline performance score, $\alpha$ is the targeted performance weight, $\Delta f_{power}$ is the difference between the target system 105 power score and the baseline power score, and $\beta$ is the targeted power weight.

$$TIV = \left(\alpha * \frac{\Delta f_{perf}}{f_{perf_{baseline}}}\right) - \left(\beta * \frac{\Delta f_{power}}{f_{power_{baseline}}}\right) \quad \text{Equation 4}$$

Figure 3:
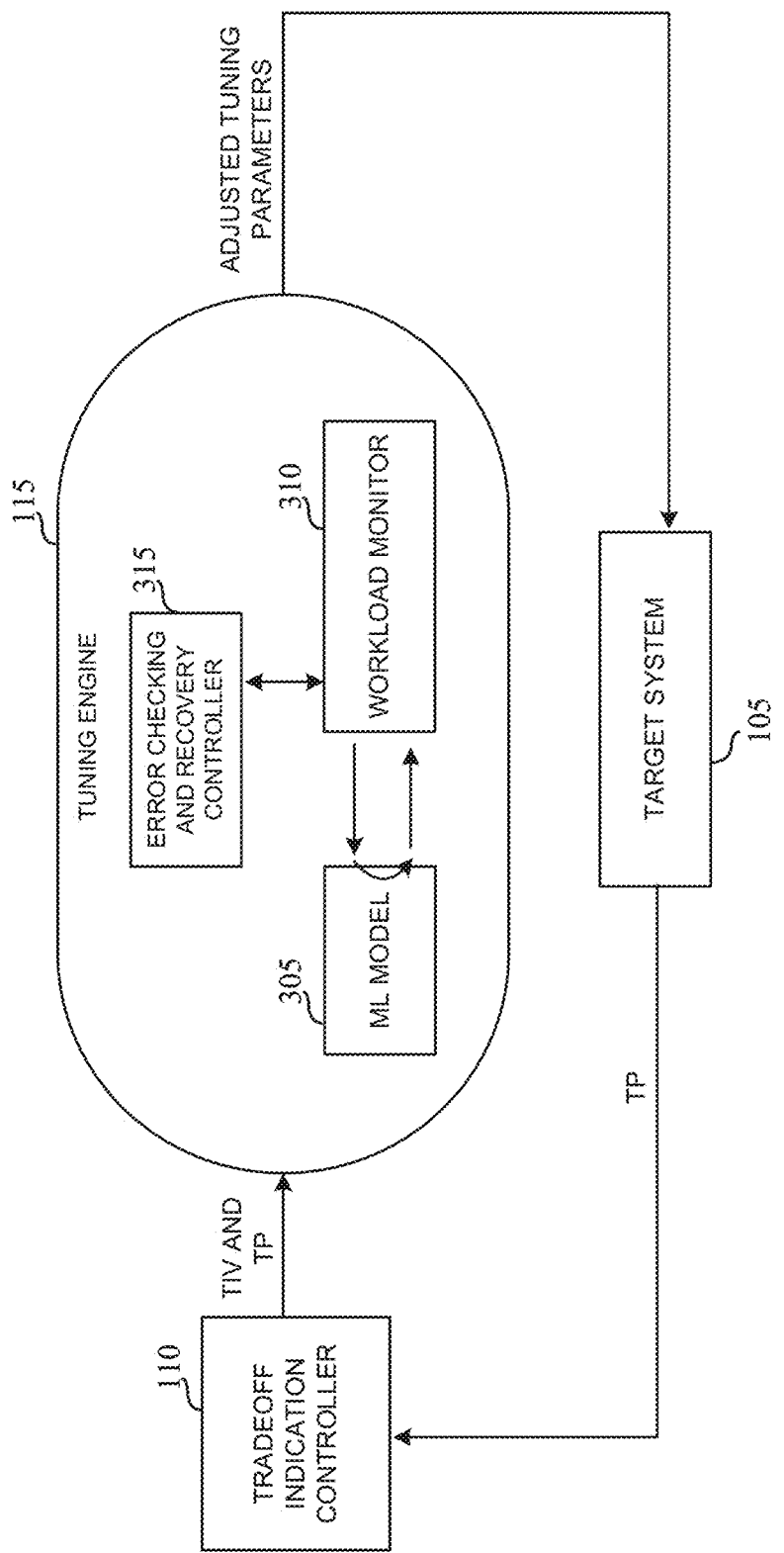
FIG. 3 is a block diagram of an example implementation of the tuning engine of FIG. 1.

FIG. 3 is a block diagram of an example implementation of the tuning engine 115 of FIG. 1. The example tuning engine 115 adjusts the tuning parameters based on the power and performance scores ($f_{perf}$, $f_{power}$, $f_{perfbaseline}$, and/or $f_{powerbaseline}$) and respective weights (e.g., $\alpha$ and/or $\beta$). FIG. 3 includes an example ML model 305, an example workload monitor 310, and an example error checking and recovery controller 315.

In the example of FIG. 3, the ML model 305 obtains the TIV from the tradeoff indication controller 110 and the initial tuning parameters from the OS thread scheduling policy of the target system 105. The example ML model 305 utilizes a Bayesian Optimization/Generic Algorithm framework to solve a multi-objective optimization problem. As used herein, multi-objective optimization is an area of multiple criteria decision making that is concerned with optimization problems involving more than one objective function to be optimized simultaneously. For example, the ML model 305 is configured to make decisions (e.g., deciding a configuration of tuning parameters) based on a performance objective and a power objective. However, the example ML model 305 can utilize any other global optimization algorithm to solve a multi-objective optimization problem. The input tuning parameters $C(\theta_C)$, $I(\theta_I)$, $F(\theta_F)$ and a range of possible values assigned to them describe a search space for the algorithm. The example ML model 305 selects the values for the tunable parameters based on the TIV and the current tuning parameters (e.g., C($\theta_C$), I($\theta_I$), F($\theta_F$)).

In the example of FIG. 3, the example workload monitor 310 applies tuning parameters, determined by the example ML model 305, to the thread scheduling policy for execution of the workload. For example, the workload monitor 310 automatically applies the values selected by the ML model 305 to configure and/or reconfigure the thread scheduling policy. Additionally, the example workload monitor 310 automatically retrieves evaluation scores (e.g., performance scores generated by the hardware) corresponding to a new TIV, compares the TIV to a criterion (e.g., $\theta_{best}$) and based on the comparison, initiates the ML model 305 to re-adjust the parameters. The workload monitor 310 receives the performance and power scores $p_i$ and $w_{i,j}$ from the tradeoff indication controller 110 after each iteration and supplies the ML model 305 with such scores. For example, the target system 105 generates and/or otherwise produces performance and power scores, and the example tradeoff indication controller 110 obtains the performance and power scores to determine the TIV. In this manner, the example ML model 305 reconfigures the tuning parameters based on the scores and the TIV. The example tuning engine 115 ultimately acts to optimize and maximize the tradeoff indication value (e.g., $\theta_{best}$=arg max TI V).

In the example of FIG. 3, the example error checking and recovery controller 315 allows for uninterrupted customization of the target system 105. In some examples, the error-checking and recovery controller 315 monitors the operating state of the system under evaluation (e.g., the target system 105). For example, the error checking and recovery controller 315 monitors whether a workload becomes suspended and/or blocked, or if an unexpected state of the hardware is detected. For example, once an unexpected (e.g., undesirable) state is detected, the system under evaluation is reverted to a last known good state so iterations can continue using a different set of parameters. In some examples, the error checking and recovery controller 315 collects telemetry data from the target system 105. For example, the error checking and recovery controller 315 queries resources of the target system 105 (e.g., hardware resources and/or software resources) to determine resource metrics (e.g., utilization metrics, network interaction metrics, etc.) when the thread scheduling policy is configured. In some examples, telemetry data is indicative of the operating state of the target system 105. For example, the error checking and recovery controller 315 can utilize the telemetry data to determine resource usage during workload execution (e.g., a number of gigabytes of memory utilized, cores utilized, etc.) and network interaction messages (e.g., communications between the resources of the target system 105 or between the target system 105 and a different system) during workload execution.

Figure 4:
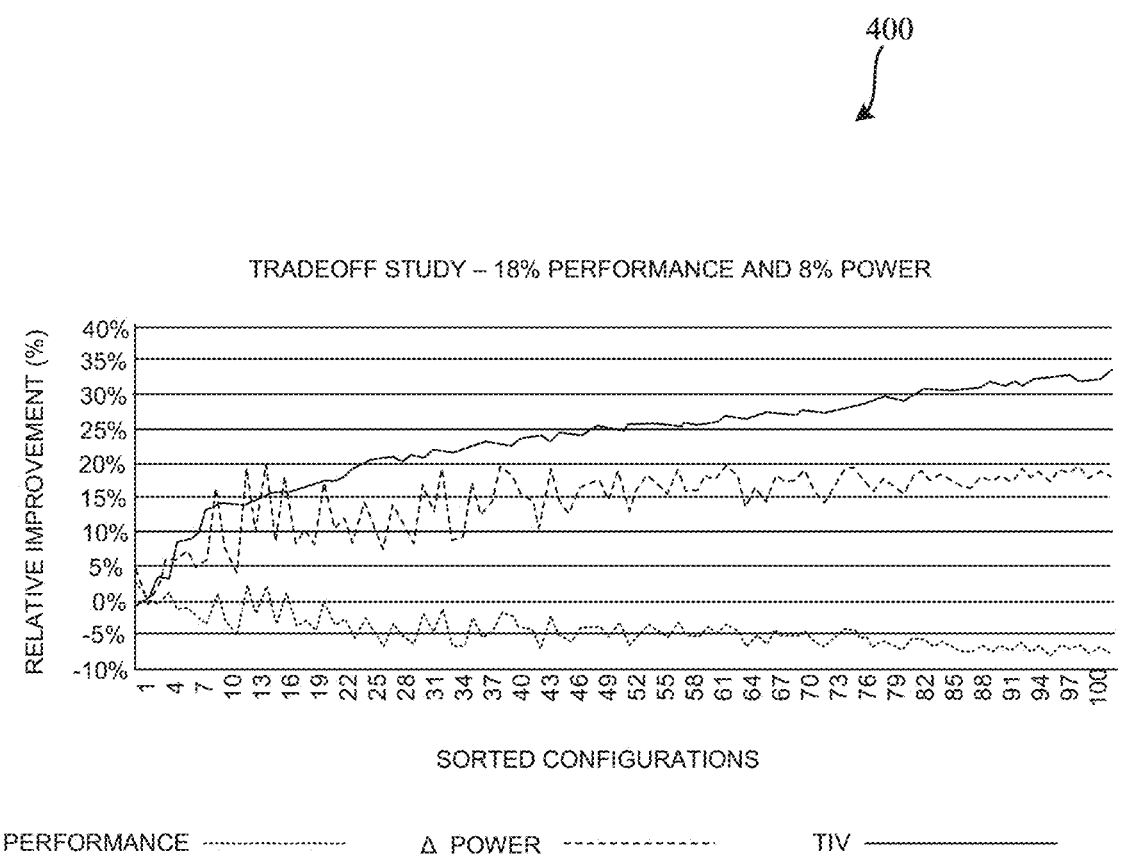
FIG. 4 is a graph illustrating results of an example study of tradeoff between performance and power of the tuning system of FIG. 1.

FIG. 4 is a graph 400 illustrating an example tradeoff study of the tuning engine 115 of FIG. 3. The target performance weight α and the target power weight β in the illustrated example were chosen to favor typical computer usage of a student user class. The example tuning system 100 executed two different workloads on a development board (e.g., the target system 105) for measuring performance and power respectively. Further, the tuning system 100 utilized the measurements from the development board to compute the TIV for each configuration of the input parameters. The example graph 400 reports the results of 97 unique configurations of tuning parameters sorted for increasing TIV. This result shows the feasibility of leveraging the TIV for power/performance tradeoff studies. The configuration of tuning parameters with the largest TIV delivers 18% performance improvement and 8% power improvement with respect to the baseline configuration of tuning parameters. For example, the tuning system 100 improved the performance of the target system 105 by 18% and the power consumption of the target system 105 by 8%, relative to the initial tuning parameters configured for the thread scheduling policy. By changing the weights of the TIV, it is possible to gear the results towards a tradeoff between performance and power suitable for different user classes. For example, the tuning engine 115 in connection with the tradeoff indication controller 110 can be configured to adjust the target performance weight α and target power weight β based on user classes.

While example manners of implementing the tuning system 100 and the target system 105 of FIG. 1 are illustrated in FIGS. 2-3, one or more of the elements, processes and/or devices illustrated in FIGS. 2-3 may be combined, divided, re-arranged, omitted, eliminated and/or implemented in any other way. Further, the example tradeoff indication controller 110, the example tuning engine 115, the example power evaluation controller 210, the example performance evaluation controller 215, the example baseline performance evaluation controller 220, the example baseline power evaluation controller 225, the example ML model 305, the example workload monitor 310, the example error checking and recovery controller 315, and/or, more generally, the example tuning system 100 and the example target system 105 of FIG. 1 may be implemented by hardware, software, firmware and/or any combination of hardware, software and/or firmware. Thus, for example, any of the example tradeoff indication controller 110, the example tuning engine 115, the example power evaluation controller 210, the example performance evaluation controller 215, the example baseline performance evaluation controller 220, the example baseline power evaluation controller 225, the example ML model 305, the example workload monitor 310, the example error checking and recovery controller 315, and/or, more generally, the example tuning system 100 and/or target system 105 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example tradeoff indication controller 110, the example tuning engine 115, the example power evaluation controller 210, the example performance evaluation controller 215, the example baseline performance evaluation controller 220, the example baseline power evaluation controller 225, the example ML model 305, the example workload monitor 310, and/or the example error checking and recovery controller 315 is/are hereby expressly defined to include a non-transitory computer readable storage device or storage disk such as a memory, a digital versatile disk (DVD), a compact disk (CD), a Blu-ray disk, etc. including the software and/or firmware. Further still, the example tuning system 100 and/or target system 105 of FIG. 1 may include one or more elements, processes and/or devices in addition to, or instead of, those illustrated in FIGS. 2-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
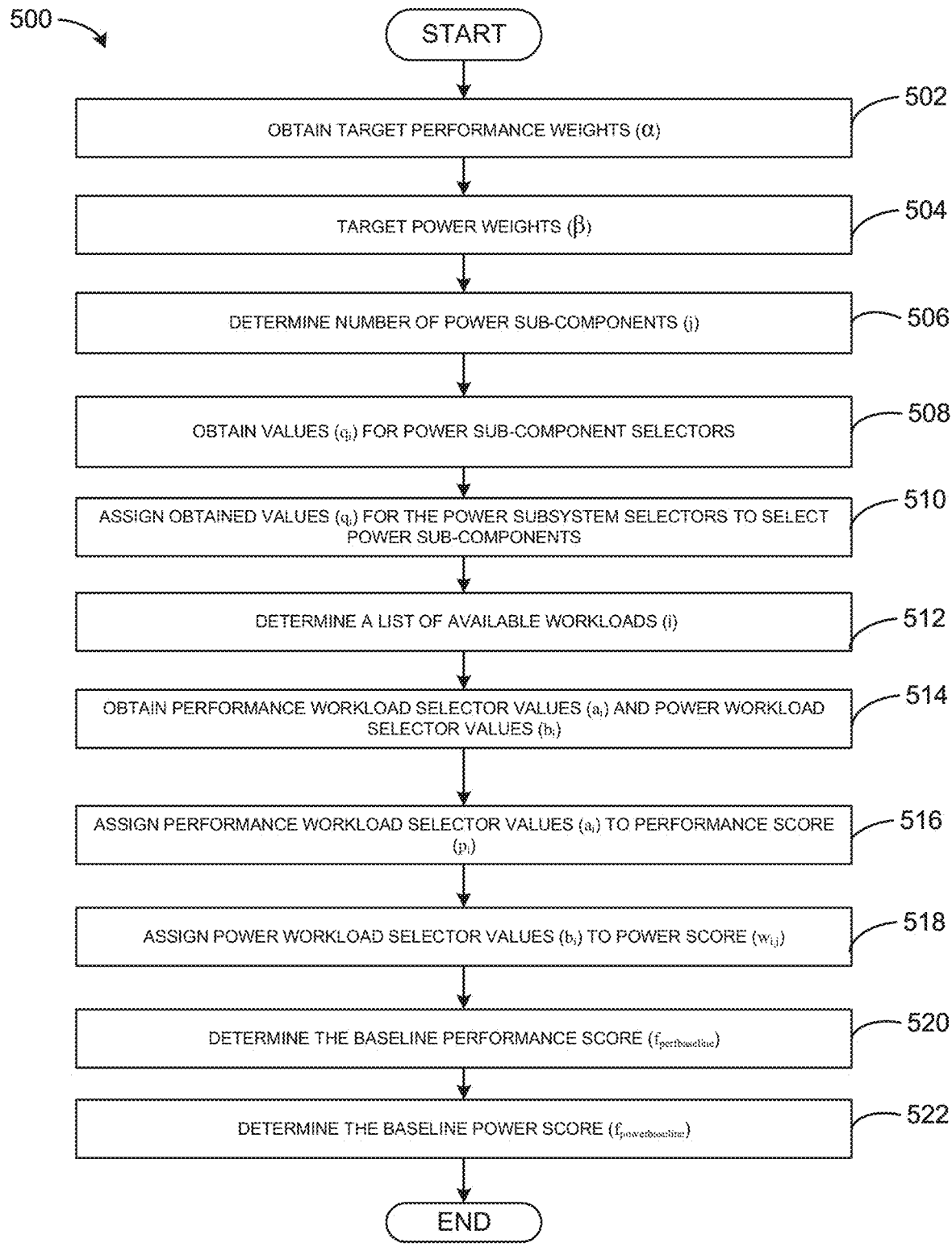
FIG. 5 is a flowchart representative of example machine readable instructions which may be executed to implement the example tradeoff indication controller of FIG. 1.
Figure 6:
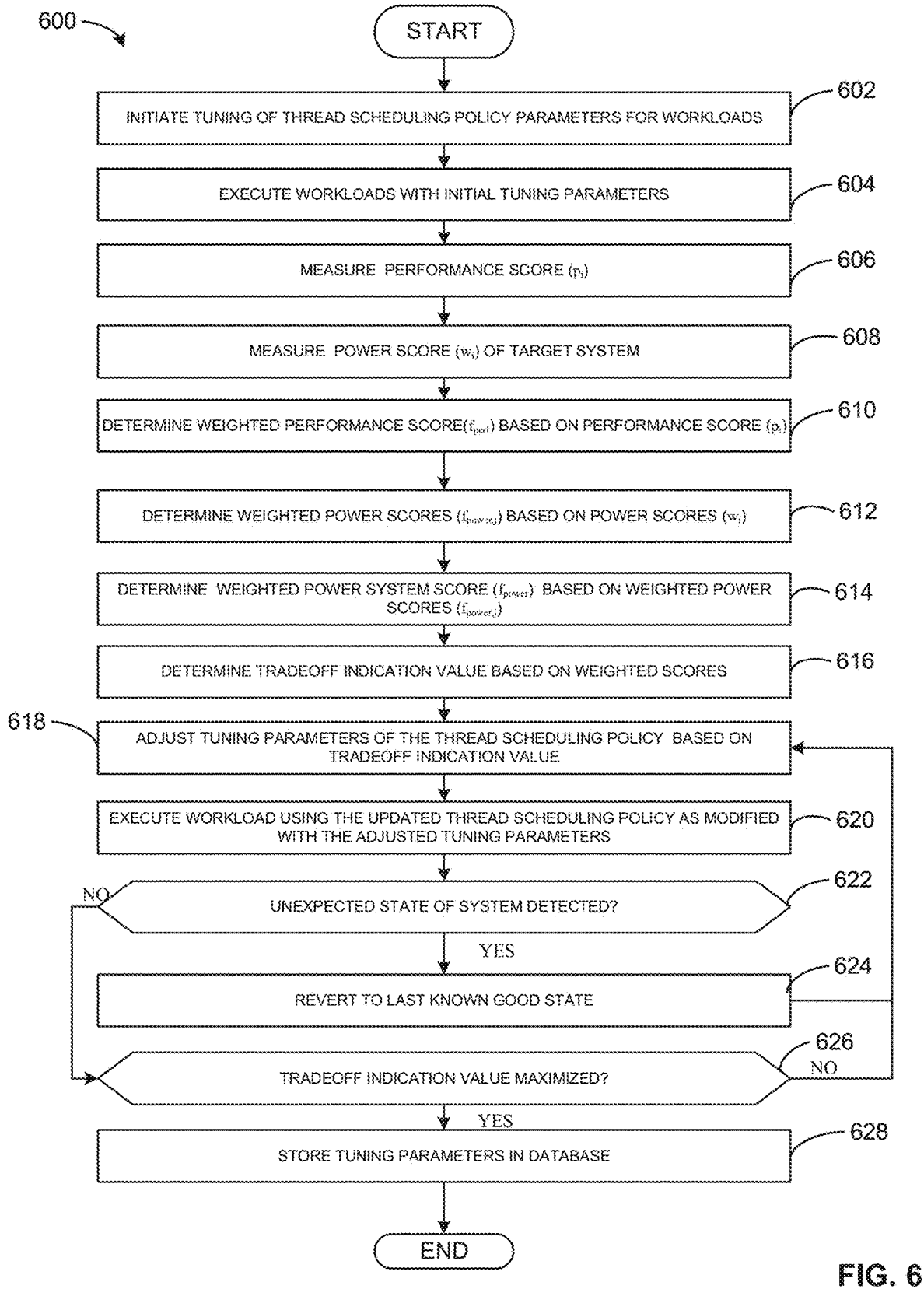
FIG. 6 is a flowchart representative of example machine readable instructions which may be executed to implement the example tuning engine of FIGS. 1 and/or 3.

Flowcharts representative of example hardware logic, machine readable instructions, hardware implemented state machines, and/or any combination thereof for implementing the tuning system 100 and/or target system 105 of FIG. 1 are shown in FIGS. 5-6. The machine readable instructions may be one or more executable programs or portion(s) of one or more executable programs for execution by a computer processor such as the processor 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 712, but the entireties of the program(s) and/or parts thereof could alternatively be executed by a device other than the processor 712 and/or embodied in firmware or dedicated hardware. Further, although the example program(s) is/are described with reference to the flowcharts illustrated in FIGS. 5-6, many other methods of implementing the example tuning system 100 and/or target system 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 illustrates an initialization phase of the tuning system 100 to determine the power and performance tradeoff of the thread scheduling policy of the example target system 105. For example, the initialization phase of the tuning system 100 is utilized to select power sub-systems and workloads that will be considered when performing tuning parameter iterations during a tuning phase (e.g., the tuning phase of FIG. 6). FIG. 6 illustrates a tuning phase of the example tuning system 100 to tune the thread scheduling policy of the example target system 105 based on the power and performance tradeoffs determined in the initialization phase.

Turning to FIG. 5, the example instructions may be executed to determine the power and performance tradeoff to be utilized to tune a thread scheduling policy for the target system 105 of FIG. 5. The program of FIG. 5 begins at block 502, at which the example tradeoff indication controller 110 (FIGS. 1 and 2) obtains target performance weight(s) ($\alpha$). Additionally, the example tradeoff indication controller 110 obtains target power weight(s) ($\beta$) (block 504). For example, the tradeoff indication controller 110 obtains the weights ($\alpha$, $\beta$) from an interface through which a user can input information (e.g., by inputting values of target performance weights and/or target power weights to by, for instance, a user interface).

The example power evaluation controller 210 (FIG. 2) determines a number of power sub-components (j) (e.g., power sub-components 205a-c) (block 506). For example, the power evaluation controller 210 determines which sub-components are in the example target system 105 (FIG. 1). The example power evaluation controller 210 obtains power sub-component selectors $q_i$ (block 508). For example, the power evaluation controller 210 obtains values $q_i$ for power sub-component selectors. The power sub-component selectors $q_i$ select which power sub-components 205a-c (FIG. 2) will be considered by the example tuning engine 115. For example, the power evaluation controller 210 receives user-defined configuration information corresponding to desired power sub-component 205a-c (FIG. 2) that will be considered by the example tuning engine 115 (FIGS. 1 and 3). The example power evaluation controller 210 assigns values to the power sub-component selectors quo select power sub-components 205a-c (block 510).

The example power evaluation controller 210 and the example performance evaluation controller 215 (FIG. 2) determine a list of available workloads i (block 512). In examples disclosed herein, the workloads i include one or more threads. The example power evaluation controller 210 and the example performance evaluation controller 215 obtain performance workload selector values ($a_i$) and power workload selector values ($b_i$) (block 514) based on the user configuration data. The example power evaluation controller 210 assigns the performance workload selector values ($a_i$) to a performance score ($p_i$) (block 516). The example performance evaluation controller 215 assigns the power workload selector values ($b_i$) to a power score ($w_{i,j}$) (block 518). The example tradeoff indication controller 110 determines the baseline performance score $f_{perfbaseline}$ (block 520). The tradeoff indication controller 110 determines the baseline power score $f_{powerbaseline}$ (block 522). For example, the tradeoff indication controller 110 determines the baseline performance score $f_{perfbaseline}$ utilizing Equation 3 above, the target performance weights, and the performance workload selector values. The example tradeoff indication controller 110 determines the baseline power score $f_{powerbaseline}$ utilizing Equation 2 above, the target power weights, the power sub-system selectors, and the power workload selector values.

The program of FIG. 5 ends when the example tradeoff indication controller 110 determines the baseline performance score $f_{perfbaseline}$ and the baseline power score $f_{powerbaseline}$. In some examples, the program of FIG. 5 restarts when a new set of target performance weights ($\alpha$) and target power weights ($\beta$) are input to the target system 105.

Turning now to FIG. 6, the example instructions of FIG. 6 may be executed to tune the thread scheduling policy of the target system 105 by utilizing the weighted performance score $f_{perf}$ and the weighted power score $f_{power}$. The program of FIG. 6 begins at block 602, at which the example tuning engine 115 (FIGS. 1 and 3) initiates tuning of thread scheduling policy parameters for workloads i. For example, when the tuning engine 115 obtains the baseline performance score $f_{perfbaseline}$ and the baseline power score $f_{powerbaseline}$ and the initial tuning parameters from the tradeoff indication controller 110, the machine readable instructions 600 begin.

The example workload monitor 310 (FIG. 3) executes workloads i based on the initial tuning parameters (block 604). For example, the OS thread scheduling policy determines the initial configuration of tuning parameters and executes the workload with those initial parameters to drive the thread scheduling policy to assign thread(s) of the workload to one or more hardware component(s) (e.g., resources of the target system 105 of FIG. 1). The example workload monitor 310 measures the performance score ($p_i$) (block 606). The example workload monitor 310 measures the power score ($w_i$) of the target system 105 (block 608). For example, the workload monitor 310 obtains the scores (e.g., the power score ($w_i$) and the performance score ($p_i$)) from the example power evaluation controller 210 (FIG. 2) and performance evaluation controller 215 (FIG. 2). Additionally, the example performance evaluation controller 215 (FIG. 2) determines the weighted performance score ($f_{perf}$) (block 610) based on performance scores ($p_i$). For example, the performance evaluation controller 215 utilizes Equation 3 above to determine the weighted performance score ($f_{perf}$). The example power evaluation controller 210 (FIG. 2) determines the weighted power scores ($f_{power,j}$) based on the power scores ($w_i$) (block 612). For example, the power evaluation controller 210 utilizes Equation 1 above to determine the weighted power scores ($f_{power,j}$). The example power evaluation controller 210 determines the weighted power system score ($f_{power}$) based on the weighted power scores $f_{power,j}$) (block 614). For example, the power evaluation controller 210 utilizes Equation 2 above to determine the weighted power system score ($f_{power}$).

The example tradeoff indication controller 110 (FIGS. 1 and 2) determines the tradeoff indication value based on the weighted power system score ($f_{power}$) and the weighted performance scores ($f_{perf}$) (block 616). For example, the tradeoff indication controller 110 (FIGS. 1 and 2) utilizes Equation 4 above to determine a TIV based on the scores ($f_{poerf}$, $f_{power}$, $f_{perfbaseline}$, $f_{powerbaseline}$). The ML model 305 (FIG. 3) adjusts tuning parameters of the thread scheduling policy based on the TIV (block 618). For example, the ML model 305 operates to maximize the TIV by adjusting the tuning parameters. In some examples, the TIV is maximized when the difference between the weighted performance score ($f_{perf}$) and the baseline performance score ($f_{perfbaseline}$) exceeds a threshold value beyond the baseline performance score ($f_{perfbaseline}$). Additionally and/or alternatively, the TIV is maximized when the difference between the weighted power system score ($f_{power}$) and the baseline power score ($f_{powerbaseline}$) exceeds a threshold value beyond the baseline performance score ($f_{powerbaseline}$). In some examples, the threshold value corresponds to the improvement percentage of performance over power or the improvement percentage of power over performance.

The example workload monitor 310 executes the workload using the updated thread scheduling policy as modified with the adjusted tuning parameters (block 620). In some examples, the error checking and recovery controller 315 (FIG. 3) determines if an unexpected state of the target system 105 has been detected (block 622). For example, the error checking and recovery controller 315 determines if an error occurred with the new tuning parameters. If an unexpected state did occur (block 622=YES), the example error checking and recovery controller 315 reverts to the last known good state (block 624) and control returns to the block 618. For example, the error checking and recovery controller 315 determines parameters of a previous iteration that indicated a good state (e.g., a state in which the threads of the workload were running without generating errors and/or faults) of the target system 105. If an unexpected state did not occur (block 622=NO), the example error checking and recovery controller 315 returns control to the example workload monitor 310. The example workload monitor 310 then determines if the TIV has been maximized (e.g., $\theta_{best}$=arg max TI) (block 626). For example, the workload monitor 310 determines the points or elements of the input value(s) (e.g., tuning parameters) of some function (e.g., ML model 305) at which the input value(s) are maximized. If the example workload monitor 310 determines the TIV was not maximized (block 626=NO), control returns to block 618 and a new iteration of adjusting the tuning parameters occurs.

If the workload monitor 310 determines the TIV was maximized (block 626=YES), the example workload monitor 310 stores the optimal tuning parameters in a memory and/or database. The example program of FIG. 6 ends. The program of FIG. 6 can be repeated when the ML model 305, or more generally the tuning engine 115, obtains a new set of baseline performance scores and baseline power scores from the tradeoff indication controller 110 to adjust the tuning parameters of the thread scheduling policy based on desired power/performance tradeoff.

Figure 7:
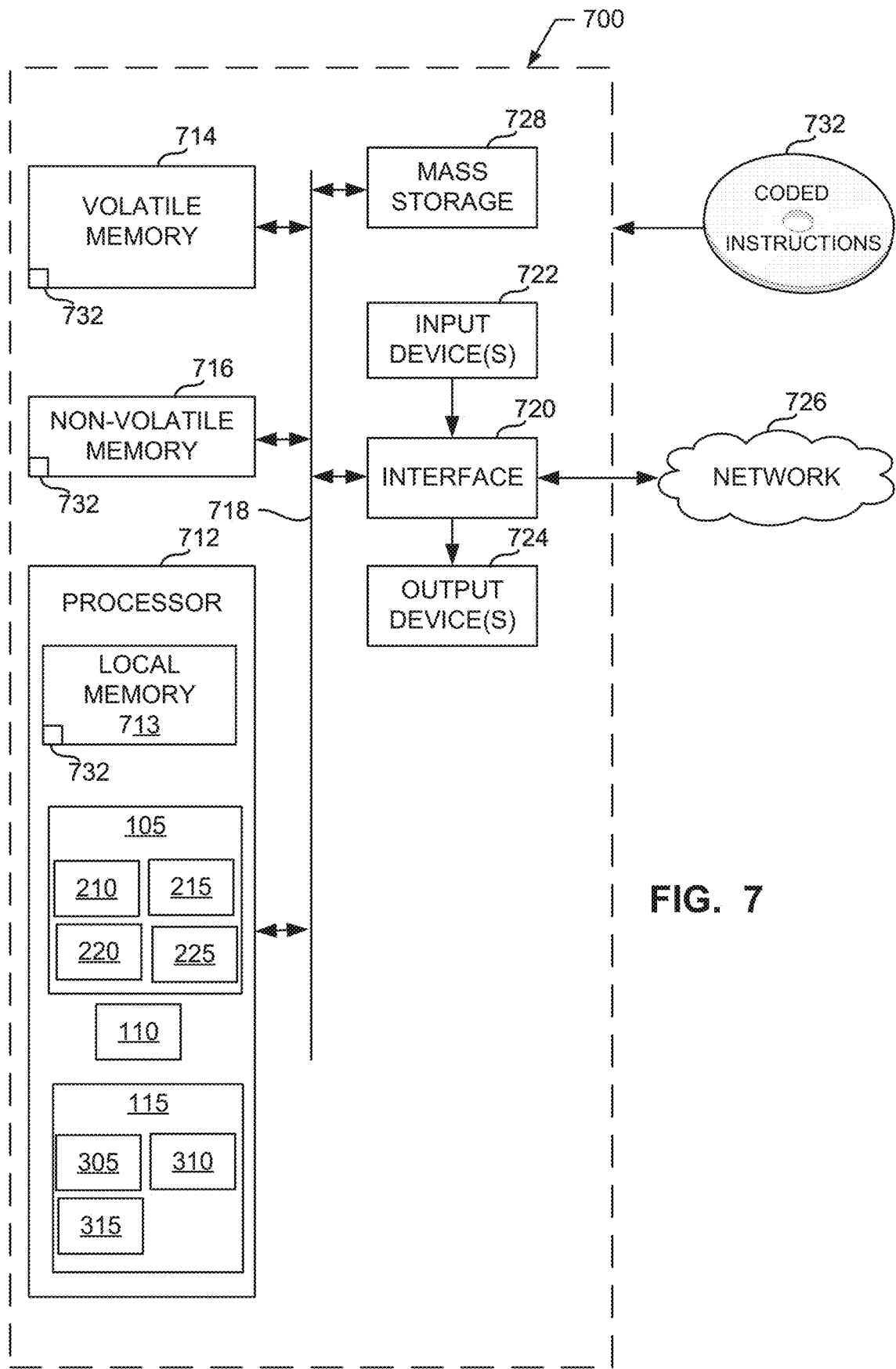
FIG. 7 is a block diagram of an example processing platform structured to execute the instructions of FIGS. 5 and/or 6 to implement the example tuning system of FIG. 1.

FIG. 7 is a block diagram of an example processor platform 700 structured to execute the instructions of FIGS. 5-6 to implement the tuning system 100 of FIG. 1. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example tradeoff indication controller 110, the example tuning engine 115, the example power evaluation controller 210, the example performance evaluation controller 215, the example baseline performance evaluation controller 220, the example baseline power evaluation controller 225, the example ML model 305, the example workload monitor 310, and the example error checking and recovery controller 315.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The example machine executable instructions 732 of FIGS. 5-6 may be stored in the mass storage device 728, in the volatile memory 714, in the non-volatile memory 716, and/or on a removable non-transitory computer readable storage medium such as a CD or DVD.

Example methods, apparatus, systems, and articles of manufacture to optimize thread scheduling are disclosed herein. Further examples and combinations thereof include the following: Example 1 includes an apparatus comprising a model to generate adjusted tuning parameters of a thread scheduling policy based on a tradeoff indication value of a target system, and a workload monitor to execute a workload based on the thread scheduling policy, obtain a performance score and a power score from the target system based on execution of the workload, the performance score and the power score corresponding to a tradeoff indication value, compare the tradeoff indication value to a criterion, and based on the comparison, initiate the model to re-adjust the adjusted tuning parameters.

Example 2 includes the apparatus of example 1, further including a performance evaluation controller to determine the performance score of the target system during multiple iterations of evaluating the workload execution to re-adjust the adjusted tuning parameters based on the performance score.

Example 3 includes the apparatus of example 1, further including a power evaluation controller to determine the power score of the target system during multiple iterations of evaluating the workload execution to re-adjust the adjusted tuning parameters based on the power score.

Example 4 includes the apparatus of example 1, further including an error checking and recovery controller to detect an unexpected state of the target system, and revert the target system to a last known good state to enable multiple iterations of evaluating the thread scheduling policy to continue re-adjusting the adjusted tuning parameters.

Example 5 includes the apparatus of example 1, wherein the workload monitor is to determine a point of the adjusted tuning parameters of the model at which the adjusted tuning parameters are maximized.

Example 6 includes the apparatus of example 1, wherein the workload monitor is to obtain a baseline performance score corresponding to a minimum performance of the target system and a baseline power score corresponding to a minimum power score of the target system.

Example 7 includes the apparatus of example 6, wherein the model is to determine initial tuning parameters based on the baseline performance score and the baseline power score of the target system, the model to generate the adjusted tuning parameters based on the initial tuning parameters to configure the thread scheduling policy for a target optimization.

Example 8 includes a non-transitory computer readable storage medium comprising instructions that, when executed, cause a machine to at least generate adjusted tuning parameters of a thread scheduling policy based on a tradeoff indication value of a target system, and execute a workload based on the thread scheduling policy, obtain a performance score and a power score from the target system based on execution of the workload, the performance score and the power score corresponding to a tradeoff indication value, compare the tradeoff indication value to a criterion, and based on the comparison, initiate a model to re-adjust the adjusted tuning parameters.

Example 9 includes the non-transitory computer readable storage medium of example 8, wherein the instructions, when executed, cause the machine to determine the performance score of the target system during multiple iterations of evaluating the workload execution to re-adjust the adjusted tuning parameters based on the performance score.

Example 10 includes the non-transitory computer readable storage medium of example 8, wherein the instructions, when executed, cause the machine to determine the power score of the target system during multiple iterations of evaluating the workload execution to re-adjust the adjusted tuning parameters based on the power score.

Example 11 includes the non-transitory computer readable storage medium of example 8, wherein the instructions, when executed, cause the machine to detect an unexpected state of the target system, and revert the target system to a last known good state to enable multiple iterations of evaluating the thread scheduling policy to continue re-adjusting the adjusted tuning parameters.

Example 12 includes the non-transitory computer readable storage medium of example 8, wherein the instructions, when executed, cause the machine to determine a point of the adjusted tuning parameters of the model at which the adjusted tuning parameters are maximized.

Example 13 includes the non-transitory computer readable storage medium of example 8, wherein the instructions, when executed, cause the machine to obtain a baseline performance score corresponding to a minimum performance of the target system and a baseline power score corresponding to a minimum power score of the target system.

Example 14 includes the non-transitory computer readable storage medium of example 13, wherein the instructions, when executed, cause the machine to determine initial tuning parameters based on the baseline performance score and the baseline power score of the target system, the instructions to generate the adjusted tuning parameters based on the initial tuning parameters to configure the thread scheduling policy for a target optimization.

Example 15 includes an apparatus comprising means for generating adjusted tuning parameters of a thread scheduling policy based on a tradeoff indication value of a target system, means for monitoring to execute a workload based on the thread scheduling policy, obtain a performance score and a power score from the target system based on execution of the workload, the performance score and the power score corresponding to a tradeoff indication value, compare the tradeoff indication value to a criterion, and based on the comparison, initiate a model to re-adjust the adjusted tuning parameters.

Example 16 includes the apparatus of example 15, further including means for determining the performance score of the target system during multiple iterations of evaluating the workload execution to re-adjust the adjusted tuning parameters based on the performance score.

Example 17 includes the apparatus of example 15, further including a means for determining the power score of the target system during multiple iterations of evaluating the workload execution to re-adjust the adjusted tuning parameters based on the power score.

Example 18 includes the apparatus of example 15, further including a means for checking to detect an unexpected state of the target system, and revert the target system to a last known good state to enable multiple iterations of evaluating the thread scheduling policy to continue re-adjusting the adjusted tuning parameters.

Example 19 includes the apparatus of example 15, wherein the means for monitoring is configured to determine a point of the adjusted tuning parameters of the model at which the adjusted tuning parameters are maximized.

Example 20 includes the apparatus of example 15, wherein the means for monitoring is configured to obtain a baseline performance score corresponding to a minimum performance of the target system and a baseline power score corresponding to a minimum power score of the target system.

Example 21 includes the apparatus of example 20, wherein the means for monitoring is configured to determine initial tuning parameters based on the baseline performance score and the baseline power score of the target system, the instructions to generate the adjusted tuning parameters based on the initial tuning parameters to configure the thread scheduling policy for a target optimization.

Example 22 includes a method comprising generating adjusted tuning parameters of a thread scheduling policy based on a tradeoff indication value of a target system, and executing a workload based on the thread scheduling policy, obtaining a performance score and a power score from the target system based on execution of the workload, the performance score and the power score corresponding to a tradeoff indication value, comparing the tradeoff indication value to a criterion, and based on the comparison, initiating a model to re-adjust the adjusted tuning parameters.

Example 23 includes the method of example 22, further including determining the performance score of the target system during multiple iterations of evaluating the workload execution to re-adjust the adjusted tuning parameters based on the performance score.

Example 24 includes the method of example 22, further including determining the power score of the target system during multiple iterations of evaluating the workload execution to re-adjust the adjusted tuning parameters based on the power score.

Example 25 includes the method of example 22, further including detecting an unexpected state of the target system, and reverting the target system to a last known good state to enable multiple iterations of evaluating the thread scheduling policy to continue re-adjusting the adjusted tuning parameters.

Example 26 includes the method of example 22, further including determining a point of the adjusted tuning parameters of the model at which the adjusted tuning parameters are maximized.

Example 27 includes the method of example 22, further including obtaining a baseline performance score corresponding to a minimum performance of the target system and a baseline power score corresponding to a minimum power score of the target system.

Example 28 includes the method of example 27, further including determining initial tuning parameters based on the baseline performance score and the baseline power score of the target system, the model to generate the adjusted tuning parameters based on the initial tuning parameters to configure the thread scheduling policy for a target optimization.

From the foregoing, it will be appreciated that example methods, apparatus and articles of manufacture have been disclosed that adjust (e.g., optimizes) the thread scheduling policy for achieving a desired tradeoff of power consumption and performance of a target system. Disclosed example methods, apparatus and articles of manufacture improve the efficiency of using a computing device by efficiently selecting tradeoffs between power consumption and performance of the target system to improve the way the thread scheduling policy allocates threads to hardware components of the cores, accelerators, and/or other hardware of the target system. Examples disclosed herein adjust the tuning parameters of a thread scheduling policy to modify the way the thread scheduling policy allocates the threads to hardware components to optimize the usage of the hardware components based on user requirements. Disclosed methods, apparatus and articles of manufacture are accordingly directed to one or more improvement(s) in the functioning of a machine, such as a computer or other electronic device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a model to generate adjusted tuning parameters of a thread scheduling policy based on a tradeoff indication value of a target system; and
   a workload monitor to:
   execute a workload based on the thread scheduling policy;
   obtain a performance score and a power score from the target system based on execution of the workload;
   assign at least one of (A) a user-selected performance workload selector value to the performance score or (B) a user-selected power sub-system selector value to the power score to determine the tradeoff indication value, the at least one of the user-selected performance workload selector value or the user-selected power sub-system selector value corresponding to removing at least one of a performance of the workload or a performance of a power sub-system of the target system from consideration in the tradeoff indication value;
   compare the tradeoff indication value to a criterion; and
   based on the comparison, initiate the model to re-adjust the adjusted tuning parameters.

2. The apparatus of claim 1, further including a performance evaluation controller to determine the performance score of the target system during multiple iterations of evaluating the workload execution to re-adjust the adjusted tuning parameters based on the performance score.

3. The apparatus of claim 1, further including a power evaluation controller to determine the power score of the target system during multiple iterations of evaluating the workload execution to re-adjust the adjusted tuning parameters based on the power score.

4. The apparatus of claim 1, wherein the adjusted tuning parameters are first adjusted tuning parameters and the re-adjusted tuning parameters are second adjusted tuning parameters, further including an error checking and recovery controller to:
   detect an unexpected state of the target system; and
   revert the target system to a last known good state to continue evaluating the thread scheduling policy using third adjusted tuning parameters different than the second adjusting the adjusted tuning parameters.

5. The apparatus of claim 1, wherein the workload monitor is to determine a point of the adjusted tuning parameters of the model at which the adjusted tuning parameters are maximized.

6. The apparatus of claim 1, wherein the workload monitor is to obtain a baseline performance score corresponding to a minimum performance of the target system and a baseline power score corresponding to a minimum power score of the target system.

7. The apparatus of claim 6, wherein the model is to determine initial tuning parameters based on the baseline performance score and the baseline power score of the target system, the model to generate the adjusted tuning parameters based on the initial tuning parameters to configure the thread scheduling policy for a target optimization.

8. A non-transitory computer readable storage medium comprising instructions that, when executed, cause a machine to at least:
generate adjusted tuning parameters of a thread scheduling policy based on a tradeoff indication value of a target system; and
execute a workload based on the thread scheduling policy;
obtain a performance score and a power score from the target system based on execution of the workload;
assign at least one of (A) a user-selected performance workload selector value to the performance score or (B) a user selected power sub-system selector value to the power score to determine the tradeoff indication value, the at least one of the user-selected performance workload selector value or the user-selected power sub-system selector value corresponding to removing at least one of a performance of the workload or a performance of a power sub-system of the target system from being included in the tradeoff indication value;
compare the tradeoff indication value to a criterion; and
based on the comparison, initiate a model to re-adjust the adjusted tuning parameters.

9. The non-transitory computer readable storage medium of claim 8, wherein the instructions, when executed, cause the machine to determine the performance score of the target system during multiple iterations of evaluating the workload execution to re-adjust the adjusted tuning parameters based on the performance score.

10. The non-transitory computer readable storage medium of claim 8, wherein the instructions, when executed, cause the machine to determine the power score of the target system during multiple iterations of evaluating the workload execution to re-adjust the adjusted tuning parameters based on the power score.

11. The non-transitory computer readable storage medium of claim 8, wherein the adjusted tuning parameters are first adjusted tuning parameters and the re-adjusted tuning parameters are second adjusted tuning parameters, the instructions, when executed, to cause the machine to:
detect an unexpected state of the target system; and
revert the target system to a last known good state to continue evaluating the thread scheduling policy using third adjusted tuning parameters different than the second adjusted tuning parameters.

12. The non-transitory computer readable storage medium of claim 8, wherein the instructions, when executed, cause the machine to determine a point of the adjusted tuning parameters of the model at which the adjusted tuning parameters are maximized.

13. The non-transitory computer readable storage medium of claim 8, wherein the instructions, when executed, cause the machine to obtain a baseline performance score corresponding to a minimum performance of the target system and a baseline power score corresponding to a minimum power score of the target system.

14. The non-transitory computer readable storage medium of claim 13, wherein the instructions, when executed, cause the machine to determine initial tuning parameters based on the baseline performance score and the baseline power score of the target system, the instructions to generate the adjusted tuning parameters based on the initial tuning parameters to configure the thread scheduling policy for a target optimization.

15. An apparatus comprising:
means for generating adjusted tuning parameters of a thread scheduling policy based on a tradeoff indication value of a target system;
means for monitoring to:
execute a workload based on the thread scheduling policy;
obtain a performance score and a power score from the target system based on execution of the workload;
assign at least one of (A) a user-selected performance workload value to the performance score or (B) a user-selected power sub-system selector value to the power score to determine the tradeoff indication value, the at least one of the user-selected performance workload selector value or the user-selected power sub-system selector value corresponding to removing at least one of a performance of the workload or a performance of a power sub-system of the target system from consideration in the tradeoff indication value;
compare the tradeoff indication value to a criterion; and
based on the comparison, initiate a model to re-adjust the adjusted tuning parameters.

16. The apparatus of claim 15, further including means for determining the performance score of the target system during multiple iterations of evaluating the workload execution to re-adjust the adjusted tuning parameters based on the performance score.

17. The apparatus of claim 15, further including means for determining the power score of the target system during multiple iterations of evaluating the workload execution to re-adjust the adjusted tuning parameters based on the power score.

18. The apparatus of claim 15, wherein the adjusted tuning parameters are first adjusted tuning parameters and the re-adjusted tuning parameters are second adjusted tuning parameters, further including a means for checking to:
detect an unexpected state of the target system; and
revert the target system to a last known good state to continue evaluating the thread scheduling policy using third adjusted turning parameters different than the second adjusted tuning parameters.

19. The apparatus of claim 15, wherein the means for monitoring is configured to determine a point of the adjusted tuning parameters of the model at which the adjusted tuning parameters are maximized.

20. The apparatus of claim 15, wherein the means for monitoring is configured to obtain a baseline performance score corresponding to a minimum performance of the target system and a baseline power score corresponding to a minimum power score of the target system.

21. The apparatus of claim 20, wherein the means for monitoring is configured to determine initial tuning parameters based on the baseline performance score and the baseline power score of the target system, the instructions to generate the adjusted tuning parameters based on the initial tuning parameters to configure the thread scheduling policy for a target optimization.

22. A method comprising:
generating, by executing an instruction with processor circuitry, adjusted tuning parameters of a thread scheduling policy based on a tradeoff indication value of a target system; and
executing, by executing an instruction with the processor circuitry, a workload based on the thread scheduling policy;
obtaining a performance score and a power score from the target system based on execution of the workload;
assigning, by executing an instruction with the processor circuitry, a zero to at least one of (A) a user-provided performance workload selector value to the performance score or (B) a user-provided power sub-system selector value to the power score to determine the tradeoff indication value, the zero indicating removing of at least one of a performance of the workload or a performance of a power sub-system of the target system from being included in the tradeoff indication value;
comparing, by executing an instruction with the processor circuitry, the tradeoff indication value to a criterion; and
based on the comparison, initiating, by executing an instruction with the processor circuitry, a model to re-adjust the adjusted tuning parameters.

23. The method of claim 22, further including determining the performance score of the target system during multiple iterations of evaluating the workload execution to re-adjust the adjusted tuning parameters based on the performance score.

24. The method of claim 22, further including determining the power score of the target system during multiple iterations of evaluating the workload execution to re-adjust the adjusted tuning parameters based on the power score.

25. The method of claim 22, wherein the adjusted tuning parameters are first adjusted tuning parameters and the re-adjusted tuning parameters are second adjusted tuning parameters, further including:
detecting an unexpected state of the target system; and
reverting the target system to a last known good state to continue evaluating the thread scheduling policy using third adjusted tuning parameters different than the second adjusted tuning parameters.

* * * * *